(12) United States Patent　(10) Patent No.: US 7,444,928 B2
Kim　(45) Date of Patent: Nov. 4, 2008

(54) APPARATUS FOR PRODUCING CRACKERS

(75) Inventor: Hyung-Seob Kim, Seoul (KR)

(73) Assignee: Delice Co., Ltd. (KR)

( * ) Notice: Subject to any disclaimer, the term of this patent is extended or adjusted under 35 U.S.C. 154(b) by 725 days.

(21) Appl. No.: 11/124,218

(22) Filed: May 6, 2005

(65) Prior Publication Data

US 2006/0249032 A1　Nov. 9, 2006

(51) Int. Cl.
*A47J 27/08*　(2006.01)
*A23L 1/18*　(2006.01)
(52) U.S. Cl. .............................. 99/373; 99/349; 99/353
(58) Field of Classification Search ................... 99/373, 99/349, 353, 355, 372; 425/260, 262, 256
See application file for complete search history.

(56) References Cited

U.S. PATENT DOCUMENTS

| | | | | |
|---|---|---|---|---|
| 2,777,404 A | * | 1/1957 | Halset | 99/373 |
| 4,147,014 A | * | 4/1979 | Tashiro et al. | 53/559 |
| 4,281,593 A | * | 8/1981 | Gevaert | 99/349 |
| 4,328,741 A | | 5/1982 | Yoshikazu | 99/332 |
| 4,667,588 A | * | 5/1987 | Hayashi | 99/372 |
| 5,102,677 A | * | 4/1992 | Van Den Berghe | 426/446 |

FOREIGN PATENT DOCUMENTS

| | | | |
|---|---|---|---|
| JP | 62-118850 | * | 11/1985 |
| WO | WO 89/06092 | * | 7/1989 |
| WO | WO 90/08477 | * | 8/1990 |

* cited by examiner

*Primary Examiner*—Reginald L Alexander
(74) *Attorney, Agent, or Firm*—Cantor Colburn LLP

(57) ABSTRACT

An apparatus for producing crackers is provided. The apparatus includes: a main frame; a drive unit installed at the main frame, and having a drive motor provided with a reducer, and first and second drive shafts receiving power from the drive motor; first and second operation cams installed at the first drive shaft; an operation unit pivotally connected to the first operation cam; an upper mold movably connected to the operation unit in a vertical direction and having a heating means; a lower mold installed directly under the upper mold and having a heating means; a grain supply unit connected to the first drive shaft to discharge a predetermined amount of grain; a grain convey unit connected to the second operation cam to convey the grain supplied from the grain supply unit to the lower mold; and a control box installed at the main frame to control the respective components.

17 Claims, 10 Drawing Sheets

APPARATUS FOR PRODUCING CRACKERS

BACKGROUND OF THE INVENTION

1. Field of the Invention

The present invention relates to an apparatus for producing crackers.

2. Description of Related Art

Crackers are produced by heating and expanding instantaneously various grains such as rice or corn, to be provided to consumers in various manners. Recently, the crackers have been in the spotlight as diet foods, since the cracker contains a carbohydrate as a main component to provide a feeling of fullness with a small meal.

A mechanism of producing the crackers is that, when grain is put in a hermetically sealed vessel to be heated therein, moisture in the grain expands to increase pressure in the vessel, and the grain has repulsion against the pressure, then, when the sealed vessel is opened to instantly decrease the pressure in the vessel, the grain instantly expands to have a volume of several times. Since the crackers produced as described above are porous and starch contained in the grain is changed to dextrin, the crackers digest well, though eating without individual cooking.

U.S. Pat. No. 4,328,741 discloses an apparatus capable of mechanically producing the crackers, entitled "Apparatus for producing crackers".

The apparatus of '741 patent includes upper and lower baking molds for forming a molding hole capable of heating and compressing rice or corn in a sealed state, a supply plate reciprocated to put new grain into a chamber when the upper and lower baking molds are opened to extract the expanded cracker located in the lower baking mold, and three air cylinders for individually operating the upper and lower baking molds and the supply plate. In addition, the apparatus should further include a compressor for generating compressed air for operating the cylinders, electronic valves for controlling the compressed air, a relay for sequentially controlling the electronic valves, and a sequence control circuit having a timer and sensors.

Therefore, '741 patent has a problem that the apparatus is frequently malfunctioned or out of order due to electrical defects such as contact error of the relay and so on. Moreover, the apparatus is very expensive to decrease economical efficiency, and have a large volume to make it difficult to find an appropriate place for installation.

SUMMARY OF THE INVENTION

Therefore, to solve the problem described hereinabove, an object of the present invention is to provide an apparatus for producing crackers capable of reducing production cost and minimizing a volume of the apparatus by simplifying the structure.

Another object of the present invention is to provide an apparatus for producing crackers capable of minimizing malfunction or out of order of the apparatus by simplifying the structure.

An apparatus for producing crackers in accordance with an aspect of the present invention includes: a main frame; a drive unit installed at the main frame, and having a drive motor provided with a reducer, and first and second drive shafts receiving power from the drive motor; first and second operation cams installed at the first drive shaft; an operation unit pivotally connected to the first operation cam; an upper mold movably connected to the operation unit in a vertical direction and having a heating means; a lower mold installed directly under the upper mold and having a heating means; a grain supply unit connected to the first drive shaft to discharge a predetermined amount of grain; a grain convey unit connected to the second operation cam to convey the grain supplied from the grain supply unit to the lower mold; and a control box installed at the main frame to control the respective components.

BRIEF DESCRIPTION OF THE DRAWINGS

The foregoing and other objects, features and advantages of the invention will be apparent from the more particular description of a preferred embodiment of the invention, as illustrated in the accompanying drawing. The drawing is not necessarily to scale, emphasis instead being placed upon illustrating the principles of the invention.

DETAILED DESCRIPTION OF THE INVENTION

Hereinafter, the detailed description of a preferred embodiment in accordance with the present invention will be apparent in connection with the accompanying drawings.

Figure 1:
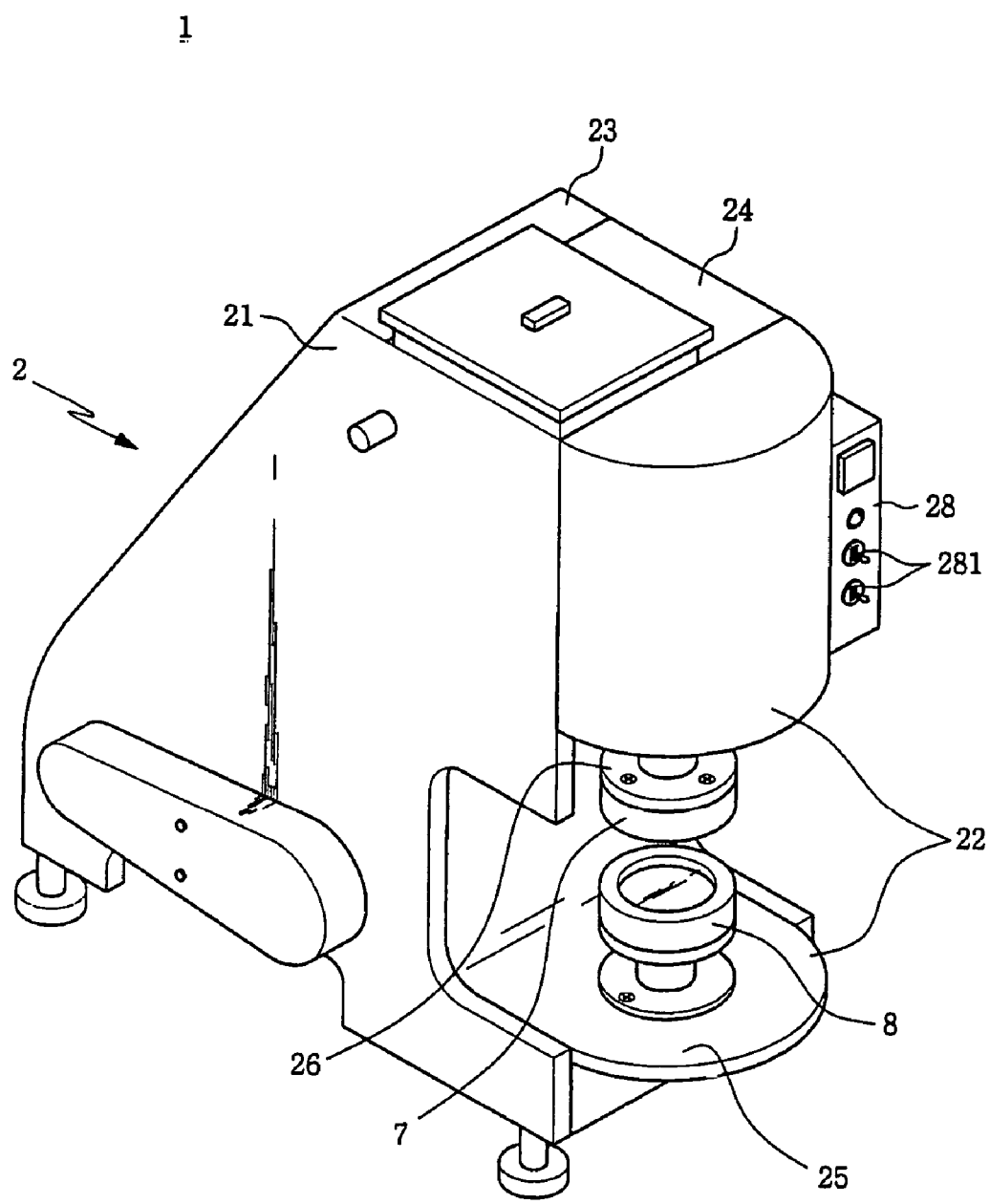
FIG. 1 is a perspective view of an apparatus for producing crackers in accordance with the present invention.

FIG. 1 is a perspective view illustrating an apparatus for producing crackers in accordance with the present invention.

Referring to FIG. 1, a main frame 2 includes a pair of side frames 21 spaced apart from each other to provide a space for installation, and a front cover 22, a rear cover 23 and an upper cover 24 are fixedly installed through the side frames 21. In addition, the main frame 2 is provided with a support plate 26 for installing an upper mold 7 and an operation table 25 for installing a lower mold 8 at a front part of the main frame, and a control box installed at its one side.

Figure 2A:
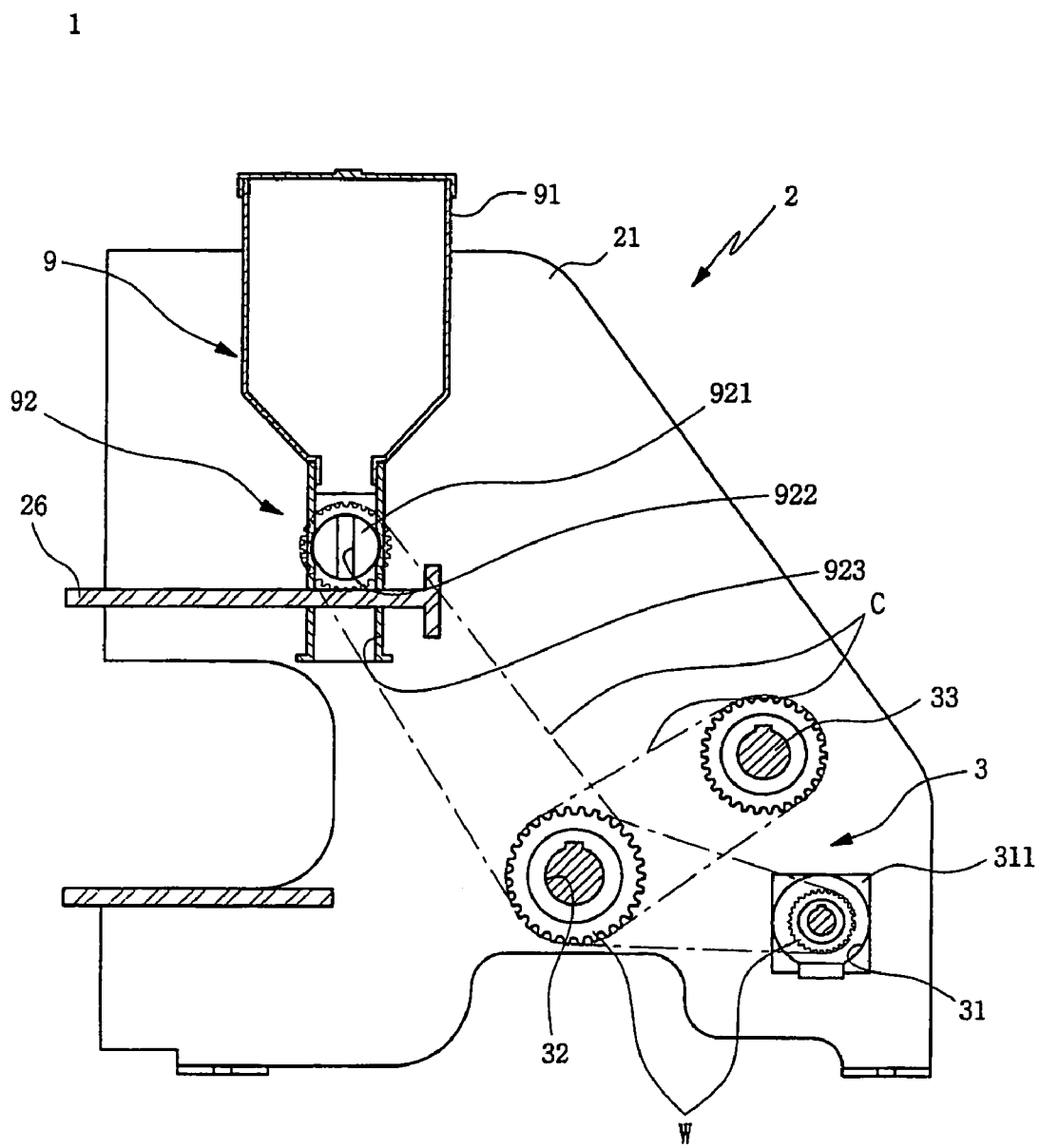
FIG. 2A is a side view illustrating a power transmission structure of an apparatus for producing crackers in accordance with the present invention.
Figure 2B:
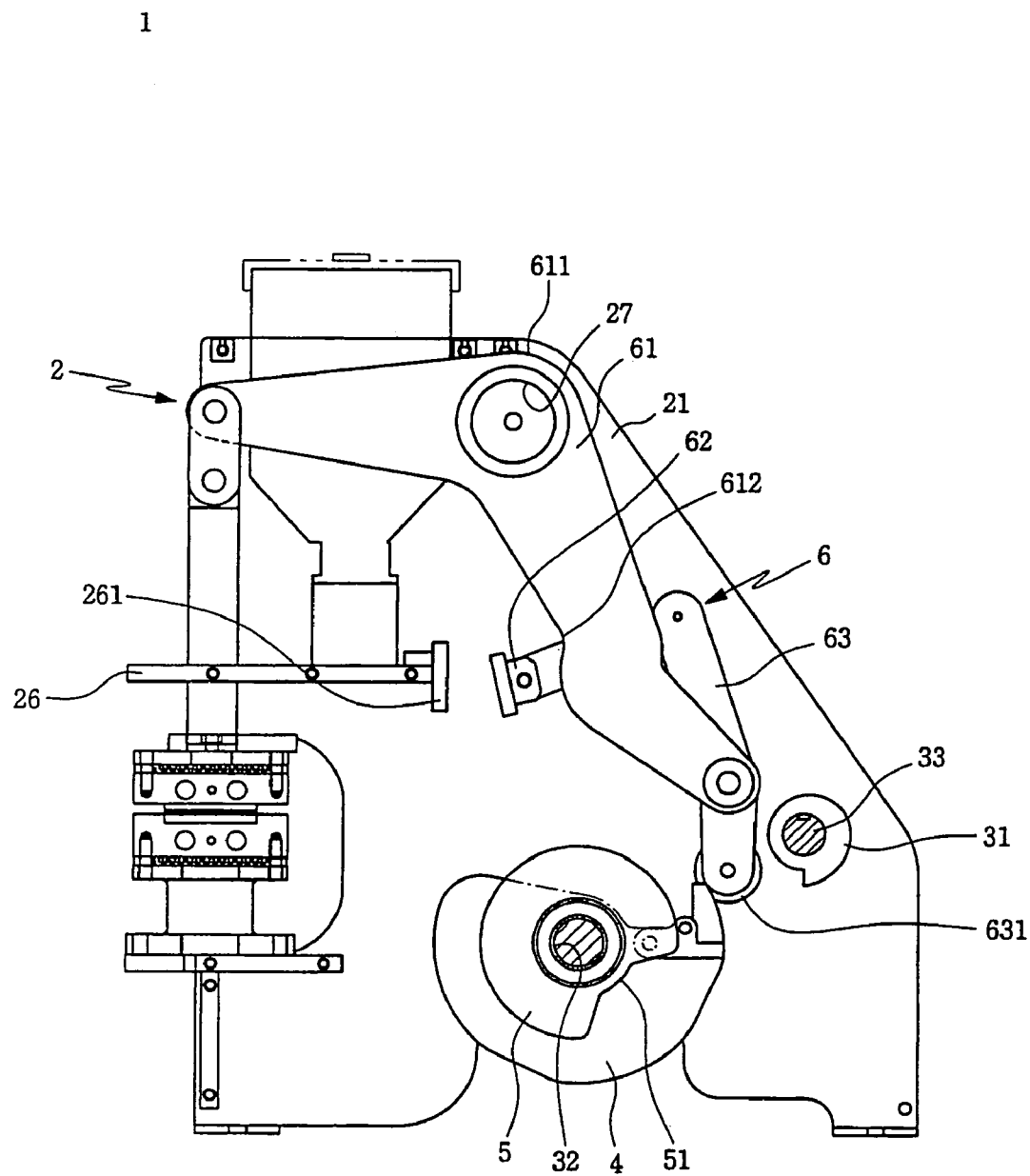
FIG. 2B is a side view illustrating an inner structure of an apparatus for producing crackers in accordance with the present invention.

FIG. 2A is a side view illustrating a power transmission structure of an apparatus for producing crackers in accordance with the present invention, and FIG. 2B is a side view illustrating an inner structure of an apparatus for producing crackers in accordance with the present invention.

Referring to FIGS. 2A and 2B, installed at a space for installation formed by the side frames 21 are various components such as a drive unit 3, first and second operation cams 4 and 5, an operation unit 6, a grain supply unit 9, and a grain convey unit 10. The drive unit 3 functions to transmit a reduced rotational force provided from a drive motor 31 with a reducer 311 to first and second drive shafts 32 and 33, as shown in FIG. 2A. For this purpose, a shaft (not shown) of the reducer 311 and the first drive shaft 32 are provided with sprocket wheels W axially engaged therewith, respectively, to be connected to each other by a chain C, and the second drive shaft 33 installed at a rear upper part of the first drive shaft 32 is connected to the first drive shaft 32 by a chain C, thereby transmitting the rotational force from the drive motor 31.

Referring to FIG. 2B, the first and second operation cams 4 and 5 are installed at the first drive shaft 32 by key-joints, respectively, and an anti-malfunction cam 331 is installed at the second drive shaft 33 to prevent malfunction of the operation unit.

Figure 3:
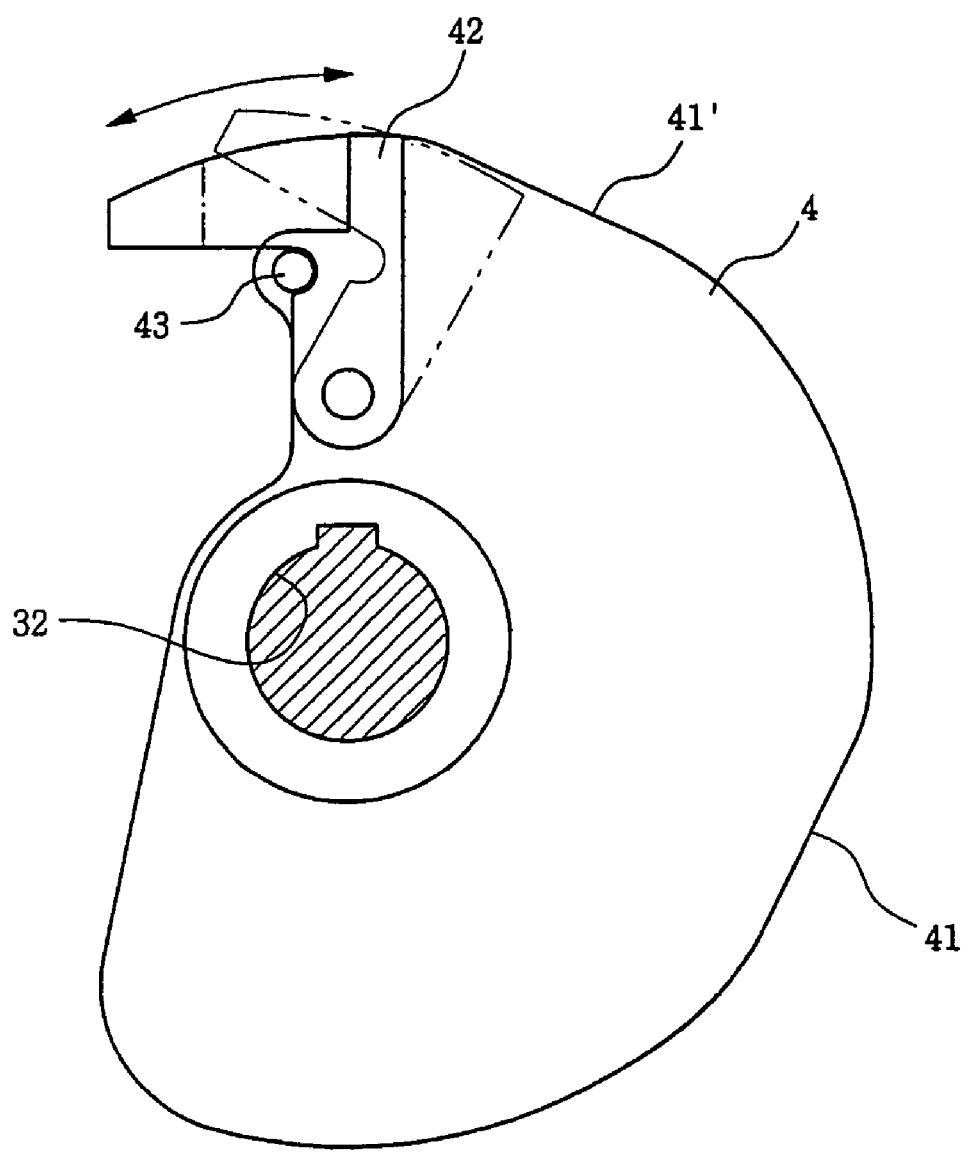
FIG. 3 is a side view illustrating a first operation cam of an apparatus for producing crackers in accordance with the present invention.

FIG. 3 is a side view illustrating a first operation cam of an apparatus for producing crackers in accordance with the present invention.

Referring to FIG. 3, the first operation cam 4 is a semi-circular plate having at least two straight regions 41 and 41' at a predetermined position of a periphery thereof, and a hook-shaped pressing part 42 pivotally installed at its one end. The pressing part 42 is pivoted within a section defined by a stopper 43 installed at the first operation cam 4. In addition, the second operation cam 5 is a circular plate, a portion of which is cut to provide an operation section 51.

Referring again to FIG. 2B, the operation unit 6 includes a lever 6, a damper bar 62, and a guide bar 63. The lever 61 is provided with two bended portions, i.e., a first bended portion 611 pivotally engaged with a center shaft 27 installed at the main frame 2, and a second bended portion 612 pivotally engaged with the damper bar 62. The guide bar 63 is provided with one end connected to the damper bar 62, a center part connected to one end of the lever 61, and the other end having a roller 631 in close contact with a periphery of the first cam 4. Therefore, the guide bar 63 connected to the first operation cam 4 operates the lever 61, and the lever 61 is pivoted about the center shaft 27. The damper bar 62 functions to absorb shock generated when the roller 631 of the guide bar 63 passes by the pressing part 42 of the first operation cam 4. In addition, preferably, the support plate 26 is provided with a shock absorbing material 261 at its one end, i.e., a position opposite to an end of the damper bar 62. The shock absorbing material may employs synthetic resin such as sponge capable of absorbing shock.

Referring again to FIG. 2A, the grain supply unit 9 includes a hopper 91 for storing grain, and a discharge module 92 for installing the hopper 91. The discharge module 92 is installed at the support plate 26, a cylindrical supply rod 921 having a discharge hole 922 is horizontally inserted directly under a discharge part of the hopper 91, and one end of the cylindrical supply rod 921 is connected to the first drive shaft 32 to be rotated to intermittently discharge a predetermined amount of grain through the discharge hole 922. In addition, a discharge port 923 extends from the discharge module 92 under the cylindrical supply rod to discharge grain to the grain convey unit 10.

Figure 4A:
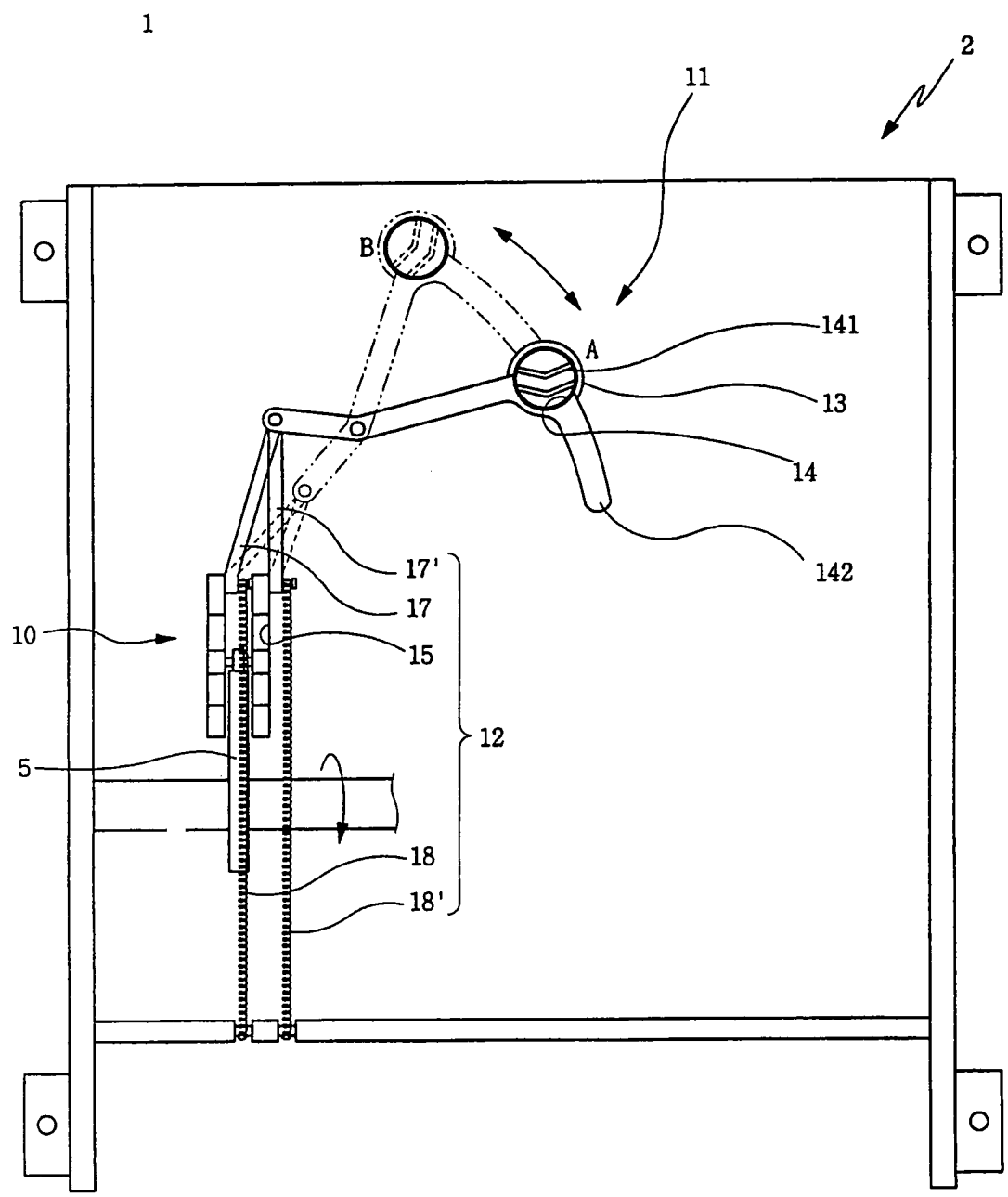
FIG. 4A is a plan view illustrating a grain convey unit an apparatus for producing crackers in accordance with the present invention.
Figure 4B:
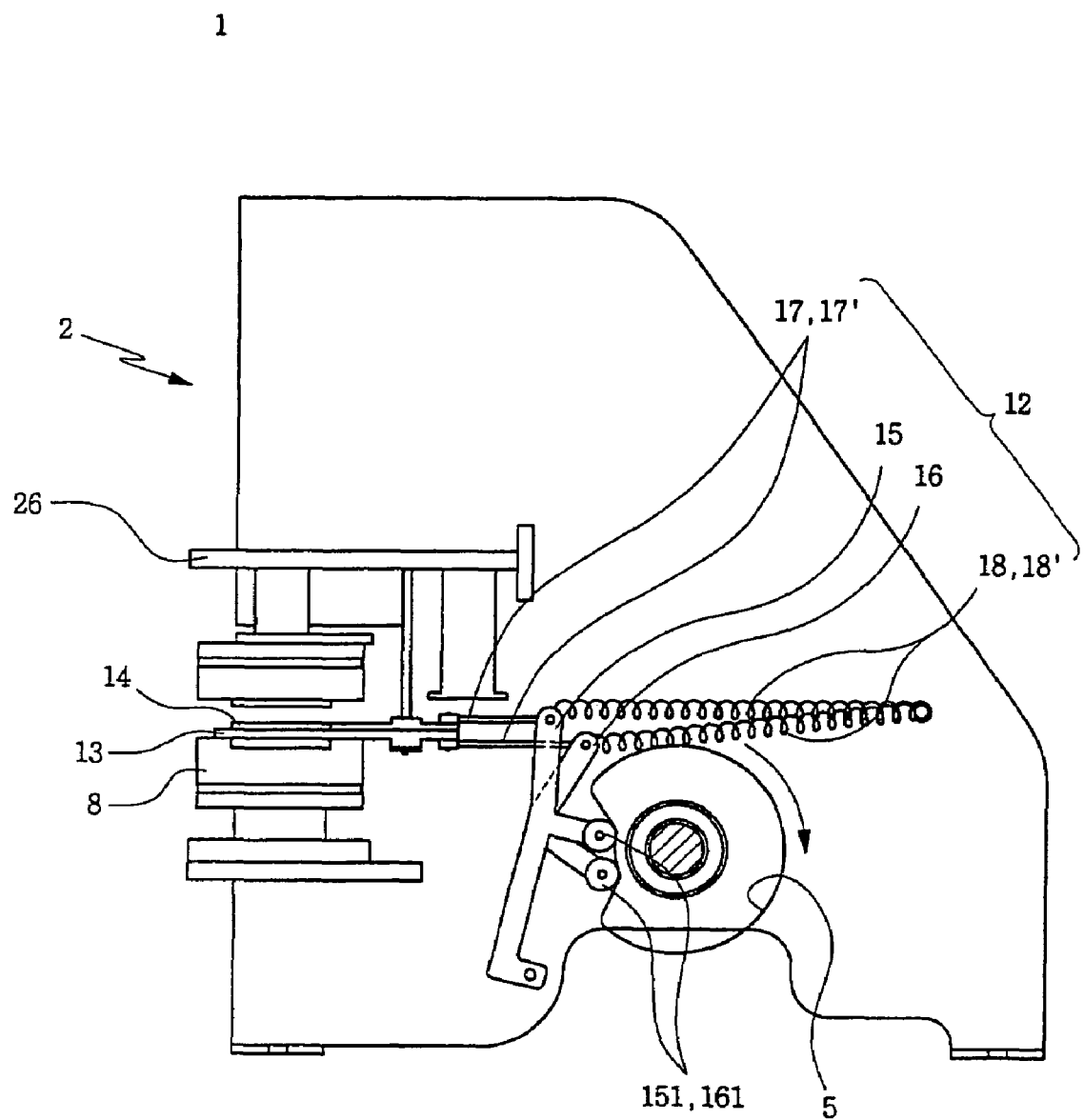
FIG. 4B is a side view illustrating the grain convey unit of FIG. 4A.

FIG. 4A is a plan view illustrating a grain convey unit an apparatus for producing crackers in accordance with the present invention, and FIG. 4B is a side view illustrating the grain convey unit of FIG. 4A.

Referring to FIG. 4A, the grain convey unit 10 includes a feeder 11 for receiving the grain at a grain discharge position A of the grain supply unit 9 to convey the grain to a position B of the lower mold 8, and a drive module 12 for driving the feeder 11. The feeder 11 includes a supply plate 13 for locating the grain discharged from the grain discharge unit 9 at its upper surface, and a supply ring installed at the upper surface of the supply plate 13 to prevent the grain located at the supply plate 13 from escaping therefrom. As shown in FIG. 4B, the supply plate 13 and the supply ring 14 are pivotally engaged with the support plate 26 of the main frame 2. In addition, as shown in FIG. 4B, the drive module 12 includes first and second operation lever 15 and 16 connected to the second operation cam 5, operation links 17 and 17' for connecting the operation levers 15 and 16 to the supply plate 13 and the supply ring 14, respectively, and a pair of operation spring 18 and 18' installed at the operation levers 15 and 16 in a direction opposite to the operation links 17 and 17'. At this time, as shown in FIG. 4, each of the respective operation levers 15 and 16 are provided with one end pivotally installed at the main frame 2, a center portion having a roller 151 or 161 in close contact with a periphery of the second operation cam 5, and the other end connected to the operation link 17 or 17' and the operation spring 18 or 18'. In this process, a contact position of the first operation lever 15 and the roller 151 to the second operation cam 5 is located in front of a contact position of the second operation lever 16 and the roller 161 to make the supply plate 13 previously move before the supply ring 14, after the supply plate 13 and the supply ring 13 convey the grain to the lower mold 8, thereby supplying the grain located at the supply plate 13 to the lower mold 8 through the supply ring 14. After the grain is supplied to the lower mold 8, the supply plate 13 and the supply ring 14 are returned to the grain discharge position of the grain supply unit 9 by attraction forces of the operation springs 18 and 18' to repeat the above-mentioned operation. In addition, as shown in FIG. 4A, the supply ring 14 for supplying the grain located at the supply plate 13 in a sweeping manner is preferably provided with a plurality of supply pieces 141 for uniformly supplying grain to the lower mold 8, and a guide piece 142 for always locating the supply ring 14 on the upper surface of the supply plate 13.

Figure 5A:
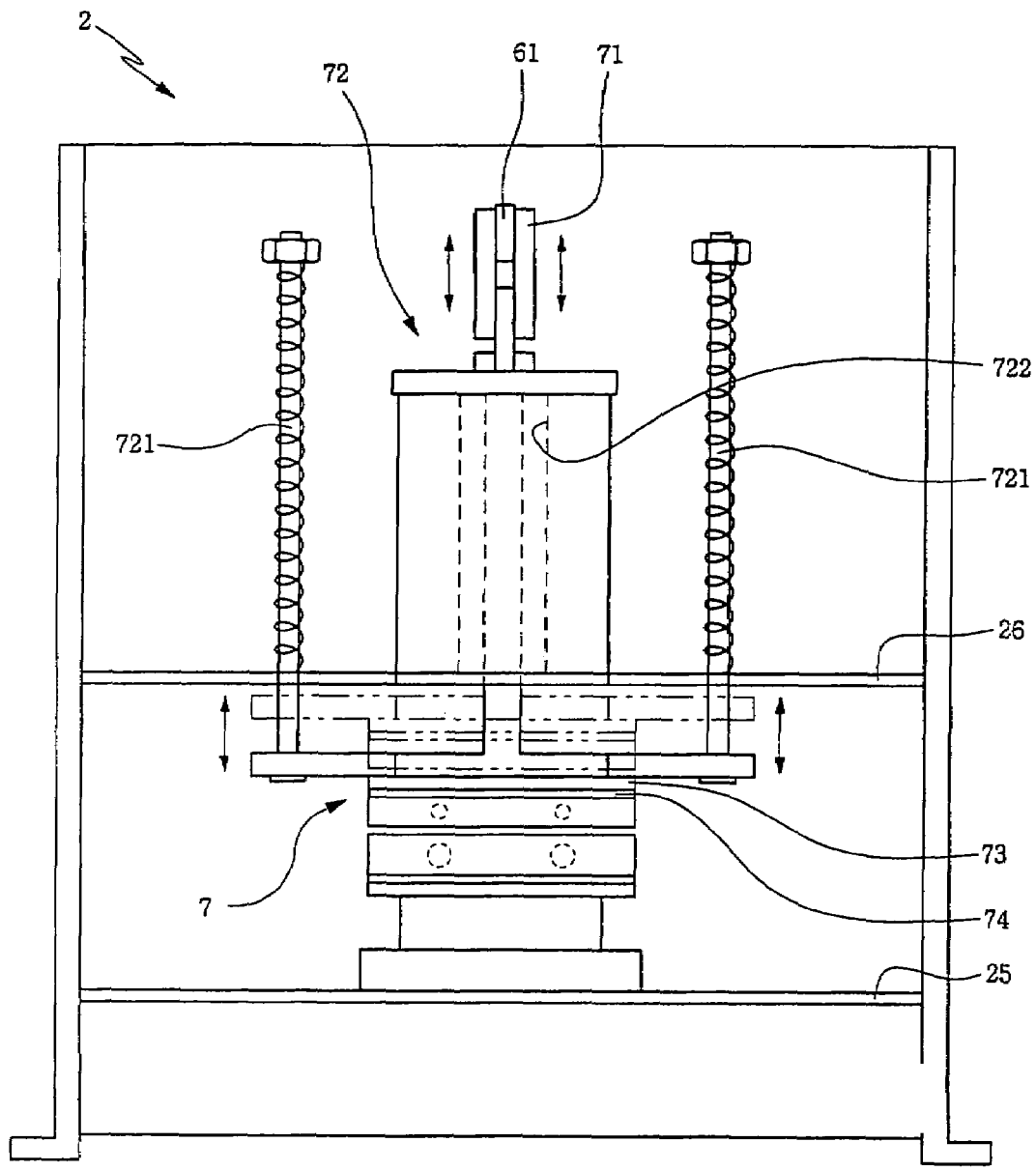
FIG. 5A is a front view illustrating upper and lower molds of an apparatus for producing crackers in accordance with the present invention.
Figure 5B:
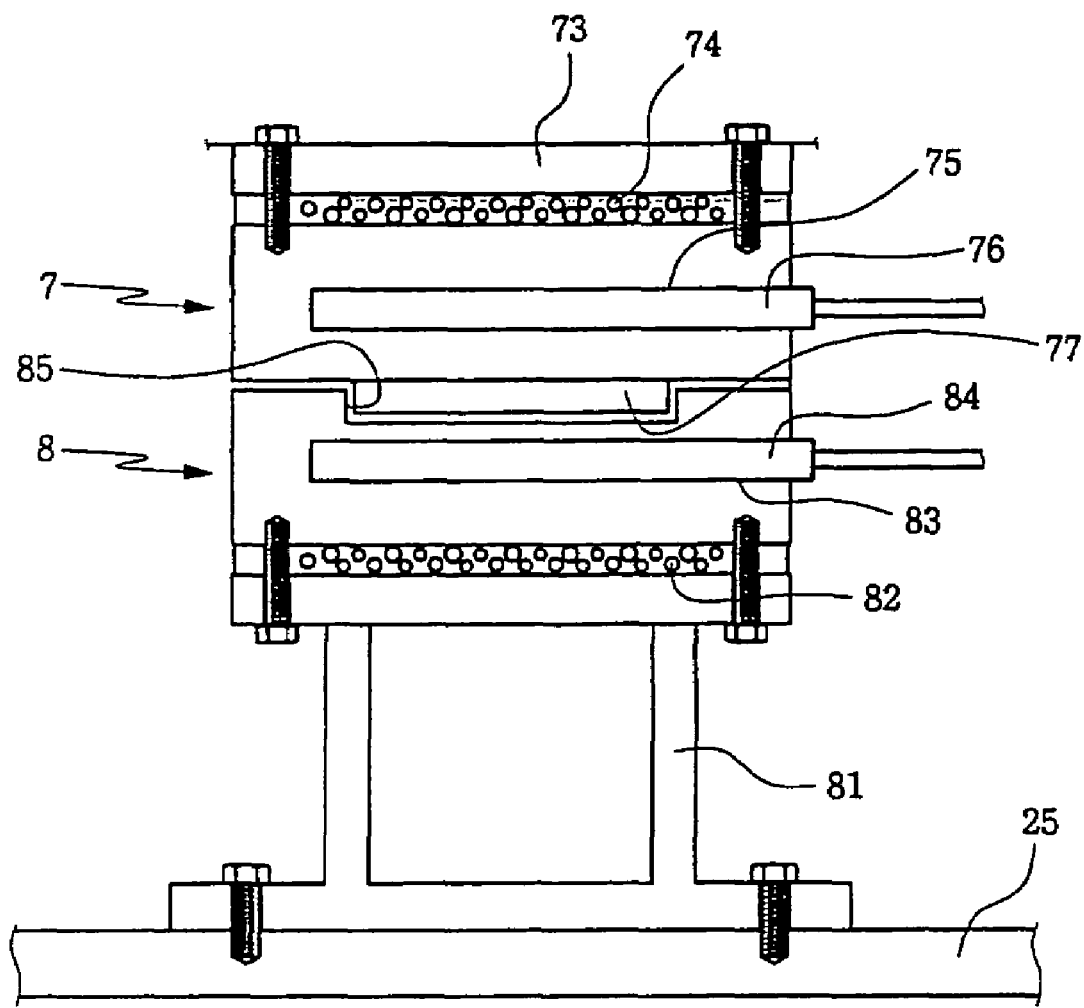
FIG. 5B is a cross-sectional side view illustrating upper and lower molds of an apparatus for producing crackers in accordance with the present invention.

FIG. 5A is a front view illustrating upper and lower molds of an apparatus for producing crackers in accordance with the present invention, and FIG. 5B is a cross-sectional side view illustrating upper and lower molds of an apparatus for producing crackers in accordance with the present invention.

Referring to FIG. 5A, the upper mold 7 is connected to the lever 61 of the operation unit 6 to be raised and lowered, which are connected to each other by medium of a link piece 71 and a raising/lowering module 72. Specifically describing, the link piece 71 is pivotally connected to the other end of the lever 61, and the link piece 71 is pivotally connected to the raising/lowering module 72 to raise and lower the upper mold 7 installed at the raising/lowering module 72. At this time, the raising/lowering module 72, installed to pass through the support plate 26 installed directly on the operation table 25, is provided with one end having resilient springs 721 supported by the support plate 26 and the other end having a shock absorber 722 for suppressing free vibration of the resilient springs 721 in order to perform compression and expansion operations when the raising/lowering module 72 is raised and lowered.

Referring to FIG. 5B, the upper mold 7 is engaged with the raising/lowering module 72 by medium of a circular plate shaped joint member 73 and an adiabatic material 74. The upper mold 7 is provided with a pair of heater bar insertion hole 75 for inserting a heater bar 76 as a heating means, and a pressing projection 77 corresponding to a chamber 85 of the lower mold 8. Therefore, the heater bar 76 is inserted in the upper mold 7 to generate heat, and the adiabatic material 74 is multi-layered to prevent the heat generated at the upper mold 7 from being conducted to another part. In addition, the lower mold 8 is fixed to the operation table 25 to be located directly under the upper mold 7 by medium of a double-flange shaped support 81 and an adiabatic material 82. The pair of heater bar insertion hole 83 for inserting a heater bar 84 as a heating means is formed at the lower mold 8 similar to the upper mold 7, and a chamber 85 for receiving the grain is formed thereon. Therefore, the heater bar 84 is inserted in the lower mold 8 to generate heat, and an adiabatic material 82 is multi-layered to prevent the heat generated at the lower mold 8 from being conducted to another part.

Meanwhile, as shown in FIG. 1, the control box 28 installed at the main frame 2 includes various control buttons 281 for controlling the respective components. In addition, the control box 28 may further include a display window for displaying temperature of the upper and lower molds 7 and 8, and a counter for displaying the number of operations. Therefore, an operator can set desired environmental conditions through the various control buttons 281.

Hereinafter, an operation of the apparatus for producing crackers in accordance with the present invention will be described.

Figure 6A:
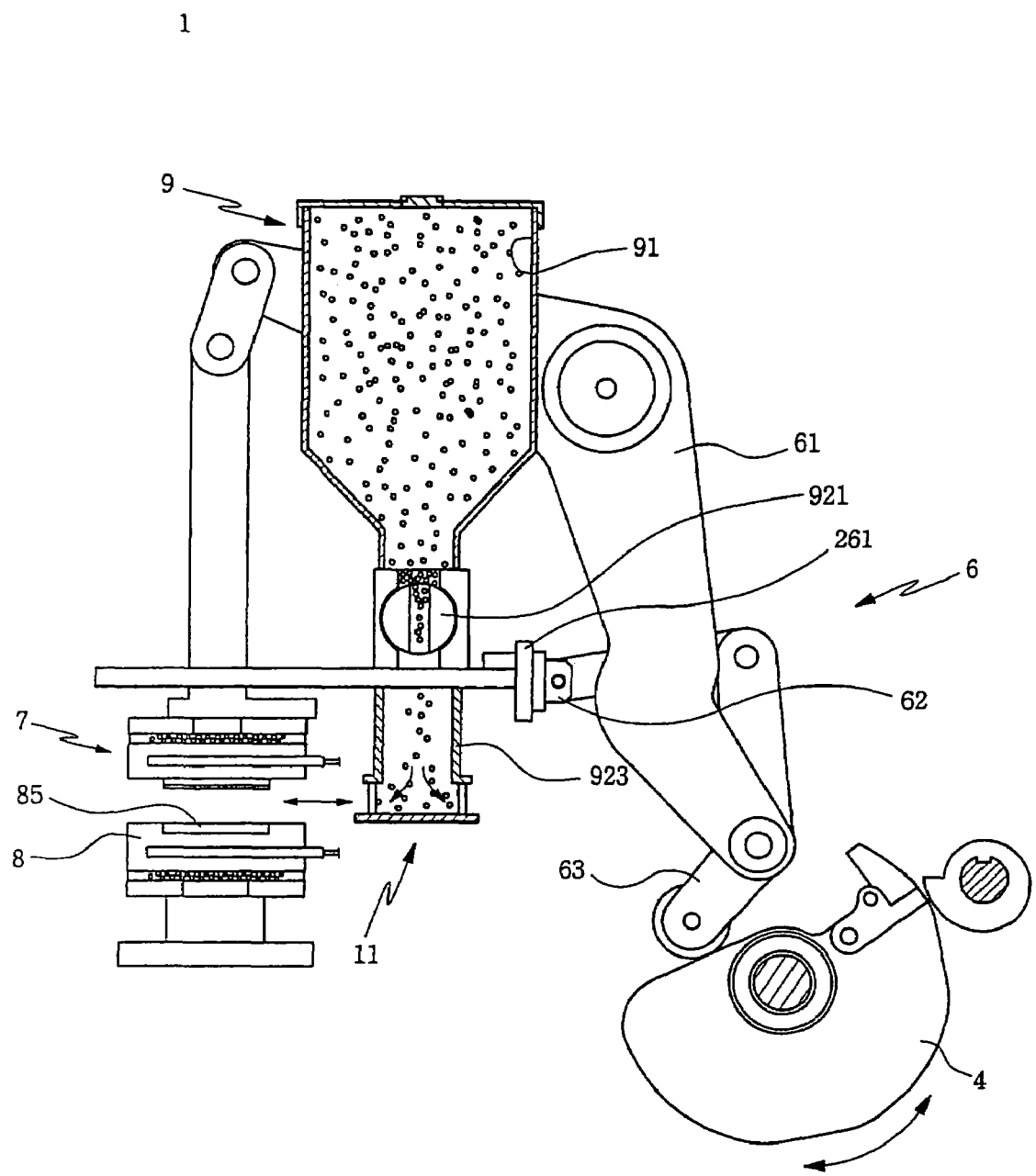
FIGS. 6A and 6B are views illustrating operations of an apparatus for producing crackers in accordance with the present invention.
Figure 6B:
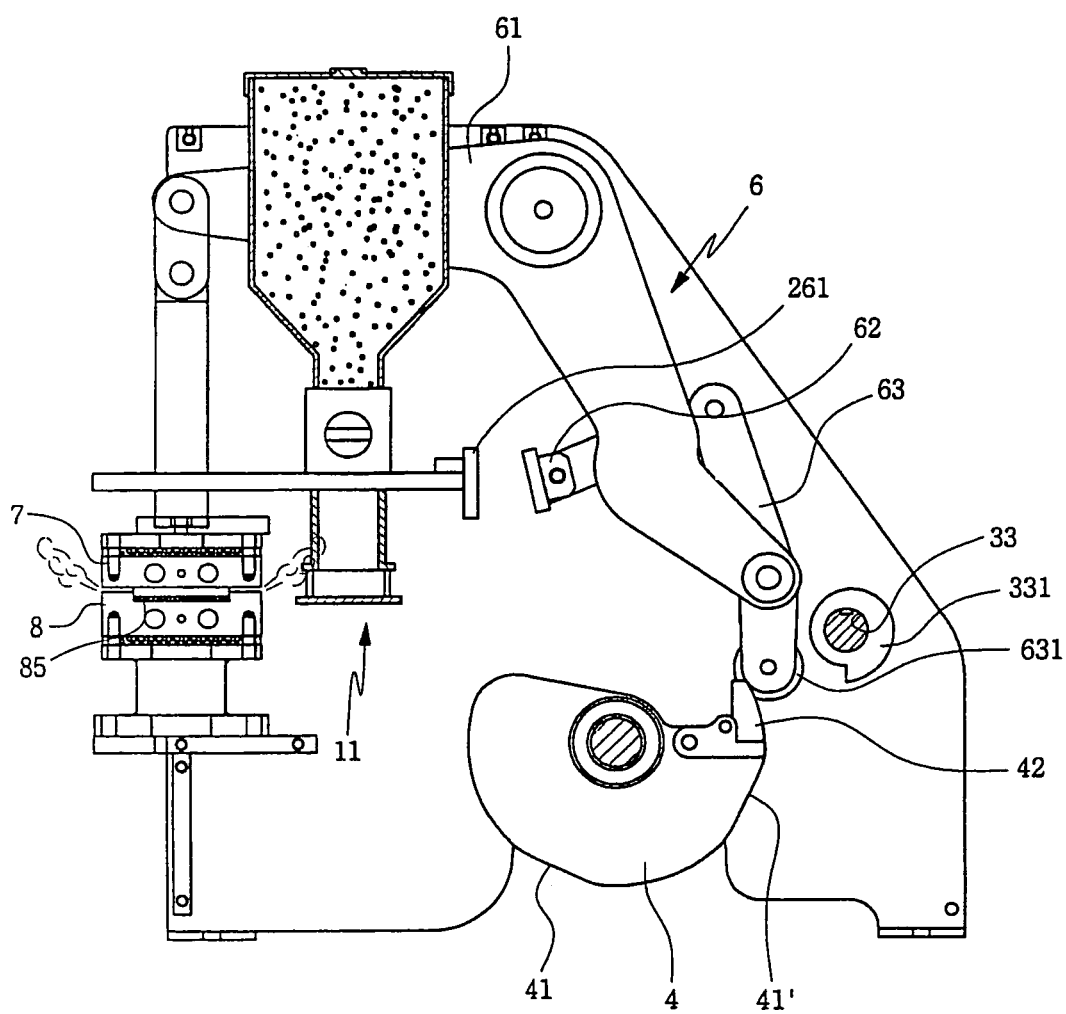

FIGS. 6A and 6B are views illustrating operations of an apparatus for producing crackers in accordance with the present invention.

Referring to FIG. 6A, a discharge module 92 of the grain supply unit 9 discharges the grain stored in the hopper 91 by operating the cylindrical supply rod 921. At this time, since the feeder 11 is on stand by at the discharge port 923 of the discharge module 92, the grain is received in the supply ring 14 located on the supply plate 13. Then, the feeder 11 is moved on the lower mold 8 by a drive module (not shown); at this time, as shown in FIG. 4B, the rollers 151 and 161 respectively installed at the operation levers 15 and 16 pass through the operation section of the second operation cam 5 and the supply plate 13 and the supply ring 14 are simultaneously moved on the lower mold 8, and then the supply plate 13 is previously returned its original position and the supply ring is returned to its original position to supply the grain to the chamber 85 of the lower mold 8. In addition, in order to open the lower and upper mold 8 and 7, the operation unit 6 raises the upper mold 7 to allow the grain to be supplied through the feeder 11, since the guide bar 63 moving along the periphery of the first operation cam 4 is located at a bottom dead center and the lever 61 corresponding to the guide bar 63 is located at a top dead center through a pivotal movement.

Referring to FIG. 6B, when the grain is supplied into the chamber 85 of the lower mold 8, the operation unit 6 lowers the upper mold 7 to locate the guide bar 63, moving along the first operation cam 4, at the top dead point to hermetically seal the lower mold 8, and the lever 61 corresponding to the guide bar 63 is pivoted to be located at the bottom dead point to allow the pressing projection 77 of the upper mold 7 to compress the chamber 85 of the lower chamber 8, thereby applying heat and pressure to the grain in the upper and lower molds 7 and 8, in which the heater bars 76 and 84 are inserted.

In this process, the guide bar 63 moving along the first operation cam 4 is lowered by a manufacture gap as it passes by straight regions 41 and 41' of the first operation cam 4, and the lever 61 corresponding to the guide bar 63 is raised to lift up the upper mold 7 by a predetermined gap to discharge gas generated in the chamber twice. Then, when the guide bar 63 of the operation unit 6 passes by the pressing part 42, since the guide bar 63 is rapidly lowered and the corresponding lever 61 is rapidly increased, the upper mold 7 is rapidly separated from the lower mold 8 depending on the operation of the lever 61. Therefore, the grain in the chamber 85 of the lower mold 8 expands up to several times of volumes to become crackers.

At this time, the damper bar 62 advances as the guide bar 63 is rapidly lowered as shown in FIG. 6A, but the damper bar 62 strikes the shock absorbing material to damp impact from the guide bar 63.

In addition, when each component of the operation unit 6 has a defect or excessive pressure is generated in the upper and lower molds 7 and 8, the roller 631 of the guide bar 63 may be stopped before passing by the pressing part 42 of the first operation cam 4; at this time, the anti-malfunction cam 331 of the second drive shaft 33 located behind the guide bar 63 strikes the roller 631 to make the roller 631 pass the pressing part 42 of the first operation cam 4, thereby preventing malfunction of the apparatus.

As can be seen from the foregoing, an apparatus for producing crackers of the present invention is capable of reducing its manufacturing cost and minimizing its volume by simplifying structure, since the cams and the levers can be engaged with each other to raise and lower the upper mold, without using a plurality of conventional air cylinders. In addition, it is possible to simplify an operation structure of the upper mold to minimize malfunction or out of order.

While this invention has been described in connection with what is presently considered to be the most practical and preferred embodiment, it is to be understood that the invention is not limited to the disclosed embodiment, but on the contrary, it is intended to cover various modification within the spirit and the scope of the Invention, which is set forth in the appended claims.

What is claimed is:

1. An apparatus for producing crackers comprising:
a main frame;
a drive unit installed at the main frame, and having a drive motor provided with a reducer, and first and second drive shafts receiving power from the drive motor;
first and second operation cams installed at the first drive shaft;
an operation unit pivotally connected to the first operation cam;
an upper mold movably connected to the operation unit in a vertical direction and having a heating means;
a lower mold installed directly under the upper mold and having a heating means;
a grain supply unit connected to the first drive shaft to discharge a predetermined amount of grain;
a grain convey unit connected to the second operation cam to convey the grain supplied from the grain supply unit to the lower mold; and
a control box installed at the main frame to control the respective components.

2. The apparatus for producing crackers according to claim 1, wherein the main frame comprises an operation table for installing the lower mold at a front part of the main frame, and a support plate for installing the upper mold.

3. The apparatus for producing crackers according to claim 1, wherein the second drive shaft is installed behind the first drive shaft, and comprises an anti-malfunction cam for preventing malfunction of the operation unit.

4. The apparatus for producing crackers according to claim 1, wherein the first operation cam is provided with at least two straight regions at predetermined parts of its periphery, and a pressing part pivotally installed at its one end.

5. The apparatus for producing crackers according to claim 1, wherein the operation unit comprises a lever pivotally engaged with a center shaft of the main frame, a damper bar pivotally engaged with the lever, and a guide bar engaged with the lever and the damper bar to be connected to the first operation cam.

6. The apparatus for producing crackers according to claim 1, wherein the main frame comprises a shock absorbing material installed at a position corresponding to an end of the damper bar.

7. The apparatus for producing crackers according to claim 1, wherein the grain supply unit comprises a hopper for storing grain, and a discharge module for intermittently discharging the grain stored in the hopper.

8. The apparatus for producing crackers according to claim 7 wherein the discharge module comprises a cylindrical supply rod horizontally installed at a discharge position of the hopper and connected to the first drive shaft by a chain, a discharge hole formed at the cylindrical supply rod to intermittently discharge the grain, and a discharge port extending from under the cylindrical supply rod.

9. The apparatus for producing crackers according to claim 1, wherein the grain convey unit comprises a feeder for receiving the grain from the grain supply unit to convey the grain to the lower mold, and a drive module for driving the feeder.

10. The apparatus for producing crackers according to claim 9, wherein the feeder comprises a supply plate for locating the grain discharged from the grain supply unit, and a supply ring installed on the supply plate to prevent the grain from escaping.

11. The apparatus for producing crackers according to claim 10, wherein the supply ring comprises a plurality of supply pieces for uniformly supplying the grain to the lower mold.

12. The apparatus for producing crackers according to claim 10, wherein the drive module comprises first and second operation levers pivotally installed to the main frame to be connected to the second operation cam, an operation link for respectively connecting the operation levers to the supply plate and the supply ring, and a pair of operation springs installed at the first and second operation levers to be located opposite to the operation link.

13. The apparatus for producing crackers according to claim 1, wherein the upper mold is connected to the lever through a link piece and a raising/lowering module to be raised and lowered.

14. The apparatus for producing crackers according to claim 13 wherein the raising/lowering module comprises a pair of resilient springs supported by the support plate, and a shock absorber for suppressing free vibration of the resilient springs.

15. The apparatus for producing crackers according to claim 1, wherein the upper and lower molds comprise a heater bar insertion hole for inserting a plurality of heater bars.

16. The apparatus for producing crackers according to claim 15, wherein the upper and lower molds comprise an adiabatic material for preventing heat generated from the heater bar from being conducted to another part.

17. The apparatus for producing crackers according to claim 1, wherein the lower mold comprises a chamber for receiving the grain at its upper surface, and a pressing projection corresponding to the chamber at its lower surface.

* * * * *